(12) United States Patent
Sugiyama (10) Patent No.: US 11,852,878 B2
(45) Date of Patent: Dec. 26, 2023

(54) OPTICAL DEVICE AND OPTICAL COMMUNICATION APPARATUS

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 17/840,178

(22) Filed: Jun. 14, 2022

(65) Prior Publication Data

US 2023/0073002 A1  Mar. 9, 2023

(30) Foreign Application Priority Data

Sep. 6, 2021  (JP) ................................. 2021-144765

(51) Int. Cl.
*G02B 6/28* (2006.01)
*G02B 6/42* (2006.01)
*G02B 6/293* (2006.01)

(52) U.S. Cl.
CPC ......... *G02B 6/4215* (2013.01); *G02B 6/2813* (2013.01); *G02B 6/29349* (2013.01); *G02B 6/4287* (2013.01)

(58) Field of Classification Search
None
See application file for complete search history.

(56) References Cited

U.S. PATENT DOCUMENTS

| | | | |
|---|---|---|---|
| 10,082,628 B2* | 9/2018 | Sugiyama | G02B 6/2861 |
| 10,551,642 B2* | 2/2020 | Sugiyama | G02F 1/0147 |
| 2020/0271963 A1* | 8/2020 | Iwatsuka | G02F 1/2255 |

FOREIGN PATENT DOCUMENTS

| | | | | |
|---|---|---|---|---|
| JP | 61-28925 | | 2/1986 | |
| JP | 2020-134874 | | 8/2020 | |
| WO | WO-03012535 A1 * | | 2/2003 | G02F 1/0121 |

* cited by examiner

*Primary Examiner* — Omar R Rojas
(74) *Attorney, Agent, or Firm* — STAAS & HALSEY LLP (57) ABSTRACT

An optical device includes a modulator and a tap coupler. The modulator includes an optical waveguide that is formed of a thin-film lithium niobate (LN) substrate and through which light passes, and an electrode that applies voltage to the optical waveguide, and modulates a phase of light that passes through the optical waveguide in accordance with an electric field in the optical waveguide, where the electric field corresponds to the voltage. The tap coupler includes at least a part formed of the thin-film LN substrate, and splits a part of the light that passes through an inside of the optical waveguide. The tap coupler includes a delayed interferometer that splits a part of the light that passes through the optical waveguide, at a split ratio corresponding to a phase difference of light that passes through an inside of the tap coupler from the optical waveguide.

10 Claims, 9 Drawing Sheets

OPTICAL DEVICE AND OPTICAL COMMUNICATION APPARATUS

CROSS-REFERENCE TO RELATED APPLICATION

This application is based upon and claims the benefit of priority of the prior Japanese Patent Application No. 2021-144765, filed on Sep. 6, 2021, the entire contents of which are incorporated herein by reference.

FIELD

The embodiments discussed herein are related to pan optical device and an optical communication apparatus.

BACKGROUND

A conventional optical modulator includes, for example, optical waveguides that are arranged on a substrate and a modulation unit that is arranged in the vicinity of the optical waveguides. The modulation unit includes a signal electrode and a ground electrode, and if voltage is applied to the signal electrode, electric fields are generated in the optical waveguides, refractive indices of the optical waveguides are changed by the electric fields in the optical waveguides, and a phase of light is changed. The optical waveguides constitute Mach-Zehnder interferometers, and optical output is changed due to a phase difference of light between the optical waveguides.

In the optical modulator, for example, Mach-Zehnder modulators for four channels are integrated. Each of the Mach-Zehnder modulators includes a radio frequency (RF) modulation unit and a direct current (DC) modulation unit. A high-frequency signal with a bandwidth of, for example, dozens of GHz is input to an electrode of the RF modulation unit, and high-speed modulation is performed. Further, bias voltage is applied to an electrode of the DC modulation unit, and bias voltage is adjusted such that ON/OFF of an electrical signal corresponds to ON/OFF of an optical signal.

The optical waveguides of the optical modulator constitute, for example, Mach-Zehnder interferometers, and output, for example, IQ signals that are x- and y-polarized due to a phase difference of light among the plurality of optical waveguides that are arranged in parallel. Further, outputs of each two of the four channels are multiplexed such that two IQ signals are formed, and one of the two IQ signals is subjected to polarization rotation, further subjected to dual-polarization by a polarization beam combiner, and then output.

Figure 9:
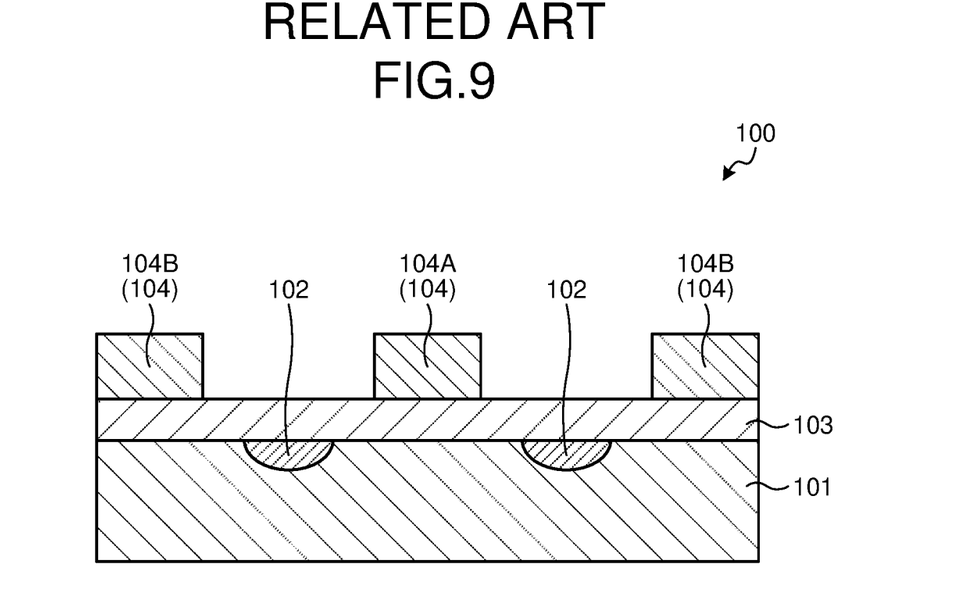
FIG. 9 is a schematic cross-sectional view illustrating an example of a conventional DC modulation unit.

In contrast, as the optical waveguide, for example, a diffused optical waveguide is known that is formed at a position that does not overlap with the signal electrode by diffusing a metal, such as titanium, from a surface of the substrate. FIG. 9 is a schematic cross-sectional view illustrating an example of a conventional DC modulation unit 100. The DC modulation unit 100 illustrated in FIG. 9 includes a lithium niobate (LN: LiNbO$_3$) substrate 101 that is an LN crystal, and diffused optical waveguides 102 that are formed on a surface of the LN substrate 101. Further, the DC modulation unit 100 includes a buffer layer 103 that covers the diffused optical waveguides 102 on the LN substrate 101, and an electrode 104 that is laminated on the buffer layer 103. The electrode 104 includes a signal electrode 104A and a pair of ground electrodes 104B.

The diffused optical waveguides 102 are arranged at positions that do not overlap with the signal electrode 104A and the pair of ground electrodes 104B. Composition and a film thickness of the buffer layer 103 are determined such that a resistance value is reduced to prevent DC drift (a temporal change of emission light caused by applied bias voltage).

However, optical confinement in the diffused optical waveguides 102 is low, so that electric field application efficiency is reduced and driving voltage is increased. To cope with this, a thin-film optical waveguide, in which an optical waveguide using a thin film made of an LN crystal is formed at a position that does not overlap with the signal electrode, has been proposed. In the thin-film optical waveguide, it is possible to increase optical confinement as compared to the diffused optical waveguide in which a metal is diffused, so that it is possible to improve the electric field application efficiency and reduce the driving voltage.

Figure 10:
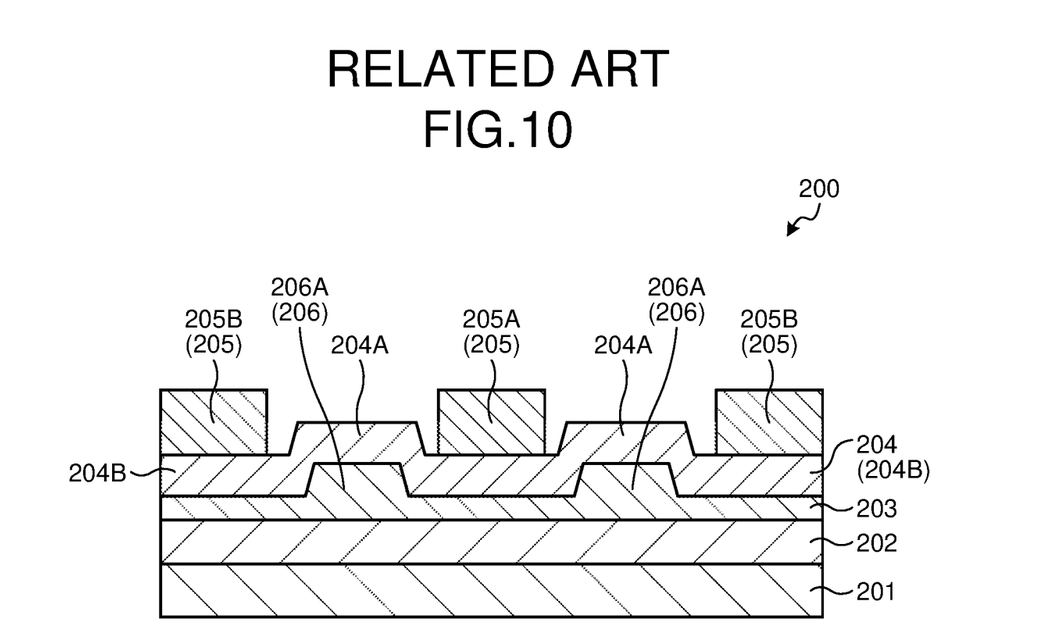
FIG. 10 is a schematic cross-sectional view illustrating an example of a conventional DC modulation unit.

FIG. 10 is a schematic cross-sectional view illustrating an example of a conventional DC modulation unit 200. The DC modulation unit 200 illustrated in FIG. 10 includes a support substrate 201 that is made of silicon (Si) or the like, and an intermediate layer 202 that is laminated on the support substrate 201. Further, the DC modulation unit 200 includes a thin-film LN substrate 203 that is laminated on the intermediate layer 202, and a buffer layer 204 that is made of SiO$_2$ and laminated on the thin-film LN substrate 203.

The thin-film LN substrate 203 serves as convex-shaped thin-film optical waveguides 206 that protrude upward. Each of the thin-film optical waveguides 206 is a rib waveguide that includes a rib 206A and slabs 206B that are formed on both sides of the rib 206A. Further, the ribs 206A and the slabs 206B are covered by the buffer layer 204, and a signal electrode 205A (205) and a pair of ground electrodes 205B (205) having a coplanar waveguide (CPW) structure are arranged on a surface of the buffer layer 204. In other words, the signal electrode 205A and the pair of ground electrodes 205B sandwiching the signal electrode 205A are arranged on the buffer layer 204. Meanwhile, the buffer layer 204 is able to prevent light that propagates through the thin-film optical waveguides 206 from being absorbed by the signal electrode 205A and the ground electrodes 205B.

The convex-shaped thin-film optical waveguides 206 are formed on the thin-film LN substrate 203 at positions between the signal electrode 205A and each of the ground electrodes 205B. Further, the buffer layer 204 at the positions between the signal electrode 205A and each of the ground electrodes 205B includes stepped portions 204A that cover the rib 206A of the thin-film optical waveguides 206. The buffer layer 204 includes portions 204B that covers the slabs 206B of the thin-film optical waveguides 206.

With use of the thin-film optical waveguides 206 as described above, by applying bias voltage to the signal electrode 205A to generate electric fields and changing refractive indices of the thin-film optical waveguides 206, it is possible to modulate light that propagates through the thin-film optical waveguides 206.

In the DC modulation unit 200, a feedback circuit is provided that splits, as monitoring light, a part of light output from the thin-film optical waveguides 206 by a tap coupler, and adjusts bias voltage applied to the signal electrode 205A on the basis of light intensity of the split monitoring light. The tap coupler used in the feedback circuit is configured with a directional coupler including two waveguides that are arranged in the thin-film optical waveguides 206. In the feedback circuit, to accurately monitor the light intensity, it is important to stabilize a split ratio of the tap coupler.

Patent Literature 1: Japanese Laid-open Patent Publication No. S61-28925

Patent Literature 2: Japanese Laid-open Patent Publication No. 2020-134874

In the thin-film optical waveguides 206 that are formed of the thin-film LN crystal, optical confinement is increased, so that light is concentrated on a certain part. However, in the waveguides of the tap coupler located adjacent to the thin-film optical waveguides 206, directional coupling for light propagation in the thin-film optical waveguides 206 is reduced. Further, the split ratio of the tap coupler is largely dependent on a width of the waveguide in the tap coupler, so that in the tap coupler, the split ratio largely varies due to the influence of a manufacturing error in the width of the waveguide. As a result, the manufacturing error in the width of the waveguide increases variation in a value of the monitoring light that is split by the tap coupler.

SUMMARY

According to an aspect of an embodiment, an optical device includes a modulator and a tap coupler. The modulator includes an optical waveguide and an electrode. The optical waveguide is formed of a thin-film lithium niobate (LN) substrate. A light passes through the optical waveguide. An electrode applies voltage to the optical waveguide. The modulator modulates a phase of the light that passes through the optical waveguide in accordance with an electric field in the optical waveguide, the electric field corresponding to the voltage. The tap coupler includes at least a part formed of the thin-film LN substrate. The tap coupler splits a part of the light that passes through an inside of the optical waveguide. The tap coupler includes a delayed interferometer that splits a part of the light that passes through the optical waveguide, at a split ratio corresponding to a phase difference of light that passes through an inside of the tap coupler from the optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present invention is not limited by the embodiments below.

[a] First Embodiment

Figure 1:
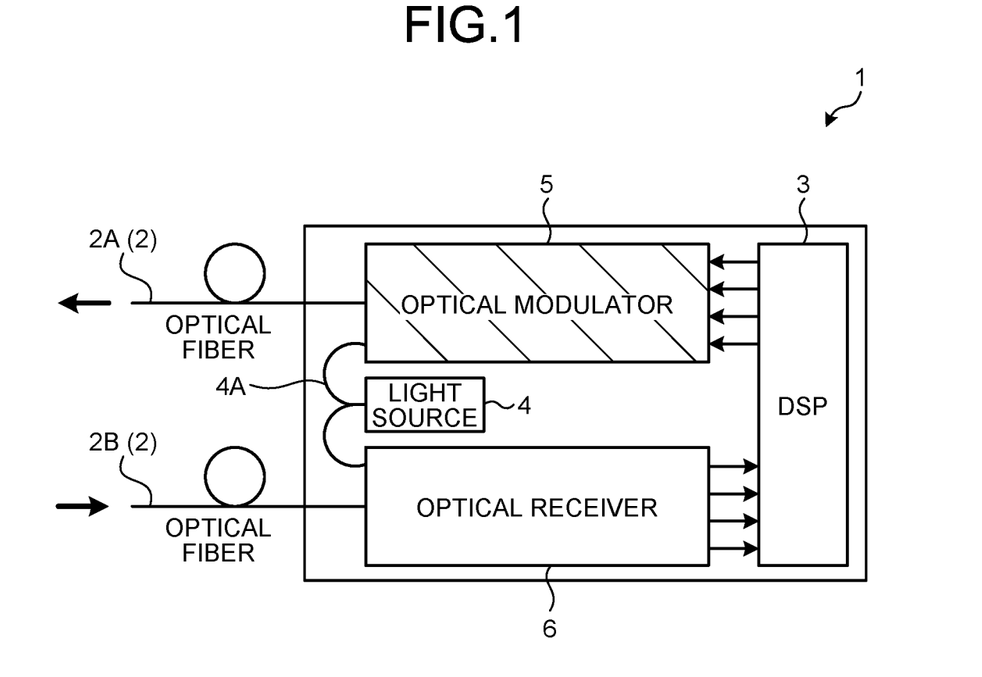
FIG. 1 is a block diagram illustrating an example of a configuration of an optical communication apparatus according to an embodiment.

FIG. 1 is a block diagram illustrating an example of a configuration of an optical communication apparatus 1 according to a first embodiment. The optical communication apparatus 1 illustrated in FIG. 1 is connected to an optical fiber 2A (2) at an output side and an optical fiber 2B (2) at an input side. The optical communication apparatus 1 includes a digital signal processor (DSP) 3, a light source 4, an optical modulator 5, and an optical receiver 6. The DSP 3 is an electrical component that performs digital signal processing. The DSP 3 performs processing, such as encoding, on transmission data, generates an electrical signal including the transmission data, and outputs the generated electrical signal to the optical modulator 5, for example. Further, the DSP 3 acquires an electrical signal including reception data from the optical receiver 6, performs processing, such as decoding, on the acquired electrical signal, and obtains reception data.

The light source 4 includes, for example, a laser diode or the like, generates light at a predetermined wavelength, and supplies the light to the optical modulator 5 and the optical receiver 6. The optical modulator 5 is an optical device that modulates the light supplied from the light source 4 by using the electrical signal output from the DSP 3, and outputs the obtained optical transmission signal to the optical fiber 2A. The optical modulator 5 is an optical device, such as a lithium niobate (LN:LiNbO$_3$) optical modulator, that includes LN optical waveguides and a modulation unit, for example. The LN optical waveguides are formed by a substrate made of an LN crystal. The optical modulator 5, when the light supplied from the light source 4 propagates through the LN optical waveguides, modulates the light by the electrical signal that is input to the modulation unit, and generates an optical transmission signal.

The optical receiver 6 receives an optical signal from the optical fiber 2B and demodulates the received optical signal by using the light supplied from the light source 4. Then, the optical receiver 6 converts the demodulated received optical signal into an electrical signal, and outputs the converted electrical signal to the DSP 3.

Figure 2:
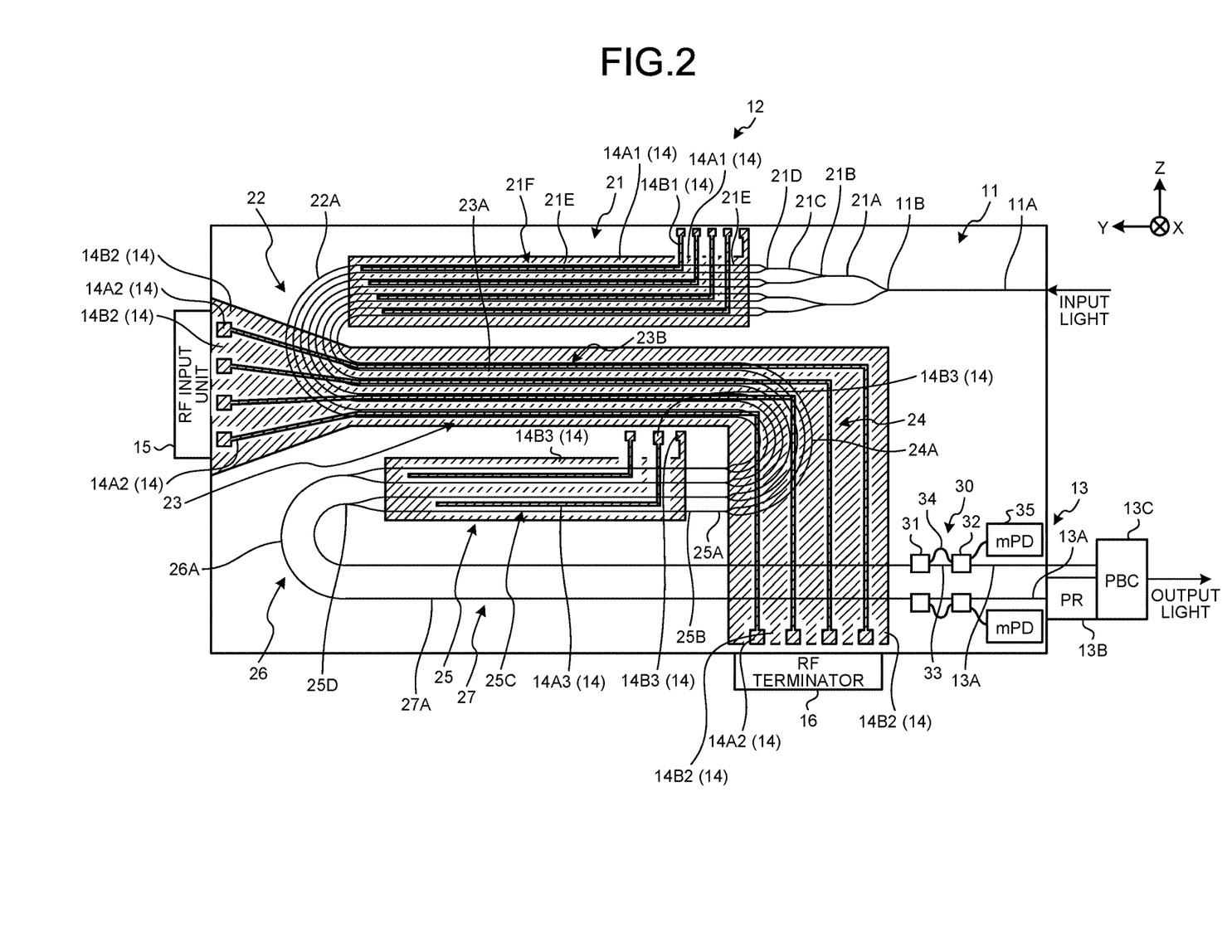
FIG. 2 is a schematic plan view illustrating an example of a configuration of an optical modulator according to the first embodiment.

FIG. 2 is a schematic plan view illustrating an example of a configuration of the optical modulator 5 according to the first embodiment. The optical modulator 5 illustrated in FIG. 2 is connected to an optical fiber 4A from the light source 4 at an input side and is connected to the optical fiber 2A for outputting a transmission signal at an output side. The optical modulator 5 includes an input unit 11, a modulation unit 12, an output unit 13, an electrode 14, a radio frequency (RF) input unit 15, and an RF terminator 16.

The input unit 11 includes a single LN waveguide 11A that is connected to the optical fiber 4A, and a first branching portion 11B. The LN waveguide 11A is a single LN waveguide that is connected to the optical fiber 4A. The first branching portion 11B optically couples the LN waveguide 11A and LN waveguides 21A in the modulation unit 12, and optically splits light from the LN waveguide 11A at 1:1.

The modulation unit 12 includes a first outward path unit 21, a first turnaround unit 22, a first return path unit 23, a second turnaround unit 24, a second outward path unit 25, a third turnaround unit 26, and a second return path unit 27.

The first outward path unit 21 is a part that optically couples the input unit 11 and the first turnaround unit 22. The first outward path unit 21 includes the two LN waveguides 21A, two second branching portions 21B, four LN waveguides 21C, four third branching portions 21D, eight LN waveguides 21E, and four first direct current (DC) modulation units 21F. The LN waveguides 21A are LN waveguides that optically couple the first branching portion 11B in the input unit 11 and the second branching portions 21B. Each of the second branching portions 21B optically couples one of the LN waveguides 21A and two of the LN waveguides 21C, and optically splits light from the LN waveguide 21A at 1:1. The LN waveguides 21C are LN waveguides that optically couple the second branching portions 21B and the third branching portions 21D. Each of the third branching portions 21D optically couples one of the LN waveguides 21C and two of the LN waveguides 21E, and optically splits light from the LN waveguide 21C at 1:1.

The first DC modulation units 21F are formed of child-side Mach-Zehnder (MZ) interferometers. Each of the first DC modulation units 21F includes two of the LN waveguides 21E and the electrode 14. The electrode 14 includes a first DC signal electrode 14A1 and a pair of first DC ground electrodes 14B1. Meanwhile, the LN waveguides 21E are, for example, rib optical waveguides that are formed by using a thin-film LN substrate 53. The thin-film LN substrate 53 has spontaneous polarization in a Z direction of the crystal axis of the LN crystal, and therefore has an internal electric field in the thin-film LN crystal. Light propagation directions of the LN waveguides 21C correspond to a Y-axis direction of the thin-film LN crystal. Each of the first DC modulation units 21F generates an electric field in each of the LN waveguides 21E in accordance with voltage applied from the electrode 14 to each of the LN waveguides 21E, and adjusts a refractive index of each of the LN waveguides 21E in accordance with the electric field. Further, each of the first DC modulation units 21F adjusts a phase of light that passes through each of the LN waveguides 21E in accordance with the adjusted refractive index of each of the LN waveguides 21E, and modulates light in accordance with a phase difference of light.

The first turnaround unit 22 is a part that optically couples the first outward path unit 21 and the first return path unit 23. The first turnaround unit 22 includes eight LN waveguides 22A. Meanwhile, light propagation directions of the LN waveguides 22A approximately correspond to the Z-axis direction of the thin-film LN crystal.

The first return path unit 23 is a part that optically couples the first turnaround unit 22 and the second turnaround unit 24. The first return path unit 23 includes eight LN waveguides 23A and four radio frequency (RF) modulation units 23B.

Each of the RF modulation units 23B includes two of the LN waveguides 23A and the electrode 14. The electrode 14 includes an RF signal electrode 14A2 and a pair of RF ground electrodes 14B2. Meanwhile, the LN waveguides 23A are, for example, rib optical waveguides that are formed by using the thin-film LN substrate 53. The thin-film LN substrate 53 has spontaneous polarization in the Z direction of the crystal axis of the LN crystal, and therefore has an internal electric field in the thin-film LN crystal. Light propagation directions of the LN waveguides 23A correspond to the Y-axis direction of the thin-film LN crystal. Each of the RF modulation units 23B generates an electric field in each of the LN waveguides 23A in accordance with voltage applied from the electrode 14 to each of the LN waveguides 23A, and adjusts a refractive index of each of the LN waveguides 23A in accordance with the electric field. Further, each of the RF modulation units 23B adjusts a phase of light that passes through each of the LN waveguides 23A in accordance with the adjusted refractive index of each of the LN waveguides 23A, and modulates light in accordance with a phase difference of light.

The RF input unit 15 is connected to the RF signal electrodes 14A2 of the RF modulation units 23B, and applies voltage (high-frequency signal) to the RF signal electrodes 14A2. The RF terminator 16 is connected to the RF ground electrodes 14B2 in the RF modulation units 23B, is connected to terminal ends of the RF signal electrodes 14A2, and prevents unnecessary reflection of signals that are transmitted by the RF signal electrodes 14A2.

The second turnaround unit 24 is a part that optically couples the first return path unit 23 and the second outward path unit 25. The second turnaround unit 24 includes eight LN waveguides 24A. Meanwhile, light propagation directions of the LN waveguides 24A approximately correspond to the Z-axis direction of the thin-film LN crystal.

The second outward path unit 25 is a part that optically couples the second turnaround unit 24 and the third turnaround unit 26. The second outward path unit 25 includes four first multiplexing units 25A, four LN waveguides 25B, two DC modulation units 25C, and two second multiplexing units 25D. Each of the first multiplexing units 25A optically couples two of the LN waveguides 24A and one of the LN waveguides 25B, and multiplexes light from the LN waveguides 24A.

The second DC modulation units 25C are formed of parent-side MZ interference interferometers. Each of the second DC modulation units 25C includes two of the LN waveguides 25B and the electrode 14. The electrode 14 includes a second DC signal electrode 14A3 and a pair of second DC ground electrodes 14B3. Meanwhile, the LN waveguides 25B are, for example, rib optical waveguides that are formed by using the thin-film LN substrate 53. The thin-film LN substrate 53 has spontaneous polarization in the Z direction of the crystal axis of the LN crystal, and therefore has an internal electric field in the thin-film LN crystal. Light propagation directions of the LN waveguides 25B correspond to the Y-axis direction of the thin-film LN crystal. Each of the second DC modulation units 25C generates an electric field in each of the LN waveguides 25B in accordance with voltage applied from the electrode 14 to each of the LN waveguides 25B, and adjusts a refractive index of each of the LN waveguides 25B in accordance with the electric field. Further, each of the second DC modulation units 25C adjusts a phase of light that passes through each of the LN waveguides 25B in accordance with the adjusted refractive index of each of the LN waveguides 25B, and modulates light in accordance with a phase difference of light. Each of the second multiplexing units 25D optically couples two of the LN waveguides 25B and one of LN waveguides 26A, and multiplexes light from each of the LN waveguides 25B.

The third turnaround unit 26 is a part that optically couples the second outward path unit 25 and the second return path unit 27. The third turnaround unit 26 includes the two LN waveguides 26A. Meanwhile, light propagation directions of the LN waveguides 26A approximately correspond to the Z-axis direction of the thin-film LN crystal. Each of the LN waveguides 26A is a waveguide that optically couples each of the second multiplexing units 25D in the second outward path unit 25 and each of LN waveguides 27A in the second return path unit 27.

The second return path unit 27 is a part that optically couples the third turnaround unit 26 and the output unit 13. The second return path unit 27 includes the two LN waveguides 27A. Meanwhile, light propagation directions of the LN waveguides 27A correspond to the Y-axis direction of the thin-film LN crystal. Each of the LN waveguides 27A is a waveguide that optically couples each of the LN waveguides 26A in the third turnaround unit 26 and the output unit 13.

The output unit 13 includes two LN waveguides 13A, a polarization rotator (PR) 13B, and a polarization beam combiner (PBC) 13C. The PR 13B rotates the I signal or the Q signal that is input from one of the second DC modulation units 25C by 90 degrees, and obtains a vertically-polarized optical signal that is rotated by 90 degrees. Then, the PR 13B inputs the vertically-polarized optical signal to the PBC 13C. The PBC 13C multiplexes the vertically-polarized optical signal input from the PR 13B and a horizontally-polarized optical signal that is input from the other one of the second DC modulation units 25C, and outputs a dual-polarized signal.

Tap couplers 30 are arranged between the LN waveguides 27A in the second return path unit 27 and the LN waveguides 13A in the output unit 13. The tap couplers 30 are arranged between the LN waveguides 27A and the LN waveguides 13A, output a part of light input from the LN waveguides 27A as the monitoring light, and output remaining light to the LN waveguides 13A in the output unit 13. Each of the tap couplers 30 includes a delayed interferometer 300 that splits a part of light that passes through the LN waveguide 27A, at a split ratio that corresponds to a phase difference of light that passes through the tap coupler 30 from the LN waveguide 27A.

Figure 3:
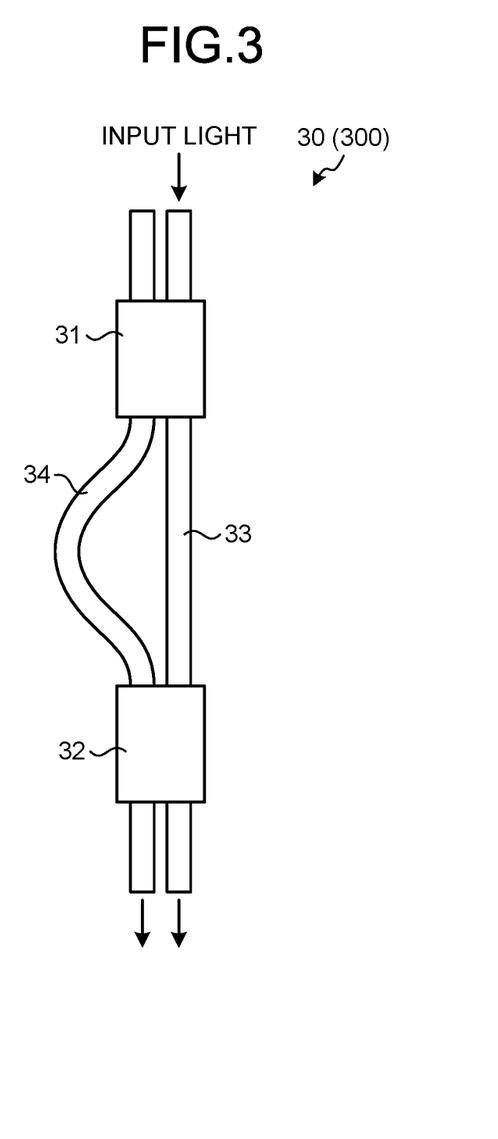
FIG. 3 is a schematic plan view illustrating an example of a configuration of a tap coupler.

FIG. 3 is a schematic plan view illustrating an example of a configuration of the tap coupler 30. The delayed interferometer 300 of the tap coupler 30 illustrated in FIG. 3 includes a first coupler 31, a second coupler 32, a first waveguide 33 and a second waveguide 34 that optically couples the first coupler 31 and the second coupler 32, and a monitor 35.

The first coupler 31 is a multi-mode interference (MMI) coupler that receives input of light from the LN waveguide 27A, splits the input light, and outputs the split light to the first waveguide 33 and the second waveguide 34. Meanwhile, as the coupler, for example, two types of couples, that is, a directional coupler and an MMI coupler are known. A split ratio of the directional coupler is highly dependent on a width of a waveguide, and the split ratio varies due to a manufacturing error in the width of the waveguide. In contrast, a split ratio of the MMI coupler is less dependent on the width of the waveguide, and even if a manufacturing error in the width of the waveguide occurs, variation in the split ratio remains low. Therefore, the MMI coupler is adopted as the first coupler 31. The first coupler 31 is the MMI coupler with double inputs and double outputs.

The first waveguide 33 is a waveguide that is formed by the thin-film LN substrate 53 and inputs one part of light split from the first coupler 31 to the second coupler 32. The second waveguide 34 is a waveguide that is formed by the thin-film LN substrate 53 and inputs the other part of light split from the first coupler 31 to the second coupler 32. The second waveguide 34 constitutes a delay unit by increasing an optical length as compared to the first waveguide 33. For example, the second waveguide 34 is a curved waveguide that includes a part in which a light propagation direction (approximately Z-axis direction of the crystal axis) is different from a light propagation direction (Y-axis direction of the crystal axis) of the first waveguide 33. In other words, a wavelength length of the second waveguide 34 is increased as compared to a waveguide length of the first waveguide 33, for example. As a result, a phase difference occurs between the one part of light that passes through the first waveguide 33 and the other part of light that passes through the second waveguide 34.

The second coupler 32 multiplexes the one part of light input from the first waveguide 33 and the other part of light input from the second waveguide 34, and splits the multiplexed light with a phase difference, at a split ratio corresponding to the phase difference. The second coupler 32 outputs, as the monitoring light, a part of the multiplexed light to the monitor 35 and outputs the remaining light to the LN waveguides 13A. The second coupler 32 is an MMI coupler. The monitor 35 receives the monitoring light that is split by the second coupler 32, and outputs, as a monitoring result, light intensity of the monitoring light to the DSP 3. The monitor 35 is a monitor Photo Diode (mPD). The DSP 3 adjusts driving voltage to be applied to the first DC modulation unit 21F, the RF modulation units 23B, and the second DC modulation units 25C on the basis of the monitoring result of the monitor 35.

Figure 4:
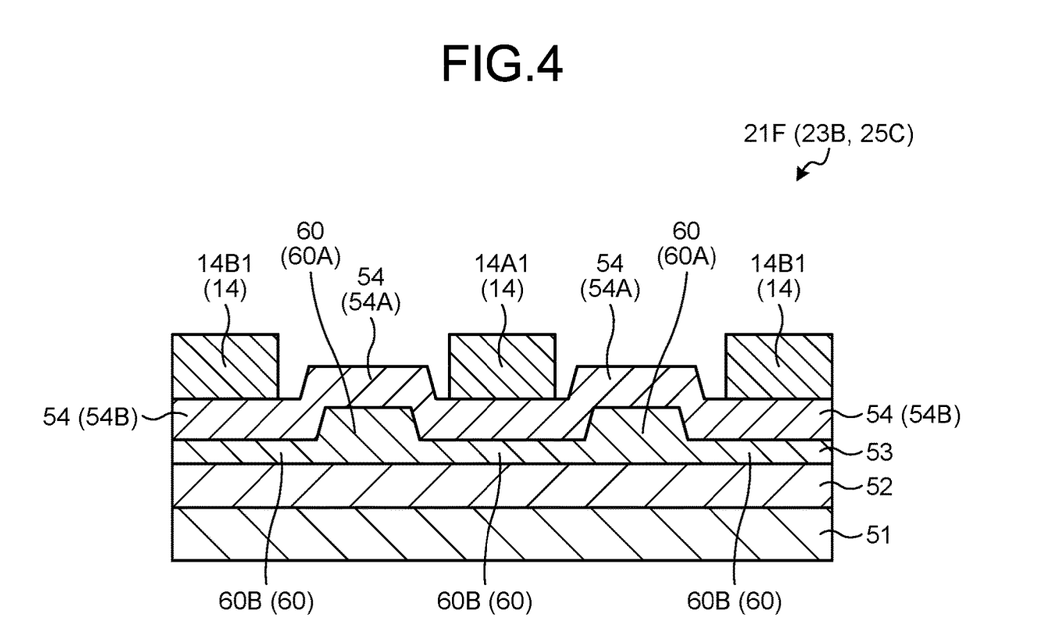
FIG. 4 is a schematic cross-sectional view illustrating an example of a first DC modulation unit.

A configuration of the optical modulator 5 according to the first embodiment will be described in detail below. FIG. 4 is a schematic cross-sectional view illustrating an example of the first DC modulation unit 21F. Meanwhile, for convenience of explanation, a single MZ interferometer is illustrated in the schematic cross-sectional view in FIG. 4, although the case has been illustrated in FIG. 2 in which the first DC modulation units 21F are formed of the four MZ interferometers. Further, as for the second DC modulation units 25C, although the case has been illustrated in which the second DC modulation units 25C are formed of the two MZ interferometers, each of the MZ interferometers has the same configuration as the first DC modulation units 21F, and therefore, the same components are denoted by the same reference symbols, and explanation of the same configurations and operation will be omitted. The first DC modulation unit 21F illustrated in FIG. 4 includes a support substrate 51, and an intermediate layer 52 that is laminated on the support substrate 51. Further, the first DC modulation unit 21F includes the thin-film LN substrate 53 that is a thin-film LN crystal laminated on the intermediate layer 52, a buffer layer 54 that is laminated on the thin-film LN substrate 53, and the electrode. The electrode 14 includes the first DC signal electrode 14A1 and the pair of first DC ground electrodes 14B1.

The support substrate 51 is a substrate that is made of, for example, Si, LN, or the like. The intermediate layer 52 is a layer that is made of a transparent material, such as $SiO_2$ or $TiO_2$, with a lower refractive index than LN. Similarly, the buffer layer 54 is a layer that is made of a transparent material, such as $SiO_2$ or $TiO_2$, with a lower refractive index than LN.

The thin-film LN substrate 53 serves as the convex-shaped thin-film optical waveguides 60 that protrude upward. The thin-film optical waveguides 60 are the LN waveguides 21E of the first DC modulation unit 21F. Each of the thin-film optical waveguides 60 is a rib optical waveguide that includes a rib 60A and slabs 60B that are formed on both sides of the rib 60A. Each of the ribs 60A includes an upper surface of the rib 60A and side wall surfaces of the rib 60A. Meanwhile, the thin-film optical waveguides 60 are, for example, the LN waveguides 11A, 21A, 21C, 21E, 22A, 23A, 24A, 25B, 26A, 27A, 13A, and the like. Further, the thin-film optical waveguides 60 are covered by the buffer layer 54. The buffer layer 54 is arranged to prevent light that propagates through the thin-film optical waveguides 60 from being absorbed by the electrode 14.

The buffer layer 54 includes portions 54A that cover upper surfaces 60A1 of the ribs 60A of the thin-film optical waveguides 60, and portions 54B that cover the slabs 60B of the thin-film optical waveguides 60. The first DC signal electrode 14A1 and the pair of the first DC ground electrodes 14B1 are arranged on the buffer layer 54.

The ribs 60A in the thin-film optical waveguides 60 serve as the thin-film optical waveguides 60 located between the first DC signal electrode 14A1 and each of the first DC ground electrodes 14B1. The slabs 60B in the thin-film optical waveguides 60 serve as the thin-film optical waveguides 60 located at the first DC signal electrode 14A1 and the first DC ground electrodes 14B1.

The thin-film optical waveguides 60 of the thin-film LN substrate 53 with thicknesses of 0.5 to 3 micrometers (μm) are sandwiched between the intermediate layer 52 and the buffer layer 54. Widths of the ribs 60A that serve as the thin-film optical waveguides 60 are, for example, about 1 to 8 μm.

The first DC signal electrode 14A1 is an electrode that is made of a metal material, such as gold or copper, has a width of 2 to 10 μm, and has a thickness of 1 to 20 μm, for example. The first DC ground electrodes 14B1 are electrodes that are made of a metal material, such as gold or copper, and have thicknesses of 1 μm or more, for example. If bias voltage corresponding to the electric signal that is output from the DSP 3 is applied to the first DC signal electrode 14A1, electric fields in directions from the first DC signal electrode 14A1 to the first DC ground electrodes 14B1 are generated, and the electric fields are applied to the thin-film optical waveguides 60. As a result, refractive indices of the thin-film optical waveguides 60 are changed in accordance with the application of the electric fields to the thin-film optical waveguides 60, and it becomes possible to modulate light that propagates through the thin-film optical waveguides 60.

The first coupler 31 in the tap coupler 30 splits light from the thin-film optical waveguide 60 into parts of light for the first waveguide 33 and the second waveguide 34. The second coupler 32 multiplexes one part of light coming from the first waveguide 33 and the other part of light coming from the second waveguide 34, splits the multiplexed light at a split ratio corresponding to a phase difference, outputs the monitoring light to the monitor 35, and outputs the remaining light to the thin-film optical waveguide 60 (the LN waveguide 13A).

The monitor 35 receives the monitoring light corresponding to the split ratio from the second coupler 32, and adjusts driving voltage of the first DC modulation units 21F, the second DC modulation unit 25C, and the RF modulation units 23B in accordance with light intensity of the monitoring light.

In the tap coupler 30 of the first embodiment, the first waveguide 33 and the second waveguide 34 are arranged between the first coupler 31 and the second coupler 32, a phase difference of light occurs in accordance with an optical length difference between the first waveguide 33 and the second waveguide 34, and a split ratio corresponding to the phase difference is set. In other words, the split ratio of the tap coupler 30 is determined based on the optical length difference between the first waveguide 33 and the second waveguide 34, and therefore is less likely affected by a manufacturing error in the width of the waveguide as in the conventional technology. As a result, even if the thin-film optical waveguides 60 with strong optical confinement are used and a manufacturing error in the width of the waveguide occurs in the tap coupler 30, it is possible to stabilize the split ratio of the tap coupler 30.

The tap coupler 30 includes the delayed interferometer 300 that splits a part of transmission light at a split ratio corresponding to the phase difference of light that passes through the tap coupler 30 from the thin-film optical waveguide 60. As a result, even if the thin-film optical waveguides 60 with strong optical confinement are used and a manufacturing error in the width of the waveguide occurs in the tap coupler 30, it is possible to stabilize the split ratio of the tap coupler 30.

The second coupler 32 in the delayed interferometer 300 multiplexes one part of light coming from the first waveguide 33 and the other part of light coming from the second waveguide 34, and splits the multiplexed light with a phase difference at a split ratio corresponding to the phase difference. As a result, it is possible to stabilize the split ratio of the tap coupler 30.

Furthermore, the MMI couplers are adopted as the first coupler 31 and the second coupler 32 of the tap coupler 30, so that it is possible to reduce variation in the split ratio even if a manufacturing error in the width of the waveguide occurs.

Meanwhile, the case has been illustrated in which, in the tap coupler 30 of the first embodiment, the first waveguide 33 and the second waveguide 34 have the different optical lengths in order to adjust the phase difference of light that passes through the first waveguide 33 and the second waveguide 34. Furthermore, the case has been illustrated in which, as a method of setting the different optical lengths between the first waveguide 33 and the second waveguide 34, the second waveguide 34 has the curved shape to increase the waveguide length as compared to the waveguide length of the first waveguide 33. However, the embodiments are not limited to the curved shape, and appropriate change is applicable as long as the waveguide length of the second waveguide 34 is increased as compared to the first waveguide 33.

Moreover, the case has been illustrated in which the split ratio of the tap coupler 30 is set by setting the different lengths for the two waveguides, i.e., the first waveguide 33 and the second waveguide 34, but appropriate change is applicable; for example, it may be possible to set the split ratio by changing the phase difference by adjusting driving voltage applied to the waveguides, instead of changing the lengths of the first waveguide 33 and the second waveguide 34.

Meanwhile, the case has been illustrated in which the first coupler 31 in the tap coupler 30 of the first embodiment is the MMI coupler with double inputs and double outputs, but the first coupler 31 may be an MMI coupler with a single input and double outputs, and this embodiment will be described below as a second embodiment.

[b] Second Embodiment

Figure 5:
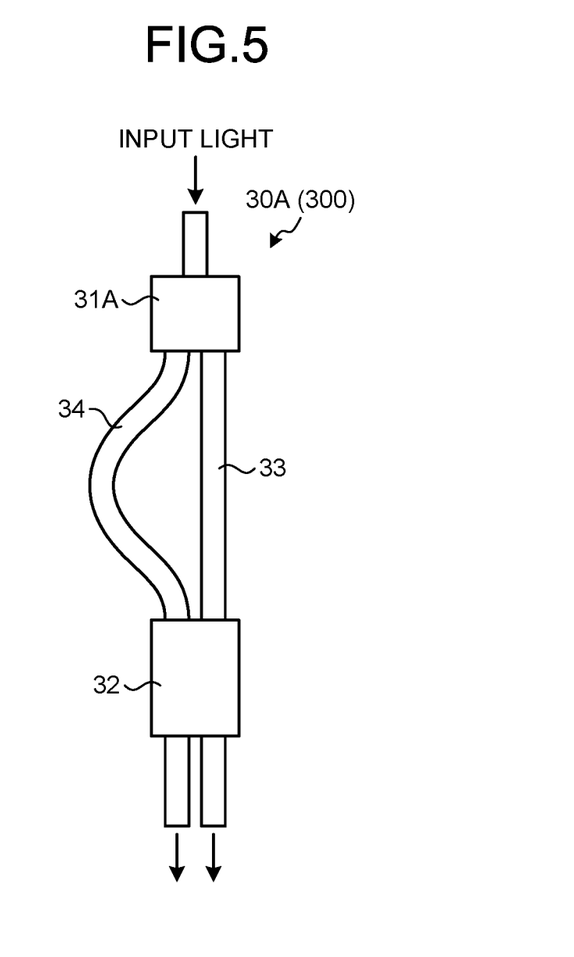
FIG. 5 is a schematic plan view illustrating an example of a configuration of a tap coupler according to a second embodiment.

FIG. 5 is a schematic plan view illustrating an example of a configuration of a tap coupler 30A according to the second embodiment. Meanwhile, the same components as those of the optical communication apparatus 1 according to the first embodiment are denoted by the same reference symbols, and explanation of the same configurations and operation will be omitted. The tap coupler 30A illustrated in FIG. 5 is different from the tap coupler 30 illustrated in FIG. 3 in that a first coupler 31A with a single input and double outputs is used instead of the first coupler 31 with double inputs and double outputs.

A size of a waveguide length of the first coupler 31A with a single input and double outputs is physically shorter than the first coupler 31 with double inputs and double outputs. The input of the first coupler 31 is optically coupled with the thin-film optical waveguide 60, and light from the thin-film optical waveguide 60 is split into parts of light for the first waveguide 33 and the second waveguide 34.

The tap coupler 30A according to the second embodiment adopts the first coupler 31A with a single input and double outputs instead of the first coupler 31 with double inputs and double outputs, so that it is possible to reduce a size in the light propagation direction as compared to the tap coupler 30 according to the first embodiment. As a result, it is possible to contribute to reduction of the size of the optical communication apparatus 1.

Meanwhile, the case has been illustrated in which, in the tap coupler 30 according to the first embodiment, the second waveguide 34 that connects the first coupler 31 and the second coupler 32 has the curved shape to constitute the delay unit. However, when the second waveguide 34 has the curved shape, an orientation of an electric field of the curved second waveguide 34 deviates from the Z-axis direction of the crystal axis, and therefore, the orientation (Z-axis direction) of the internal electric field of the spontaneous polarization and the orientation of the electric field in the second waveguide 34 of the delayed interferometer 300 become different. An embodiment of the tap coupler 30 in which the orientation (Z-axis direction) of the internal electric field of the spontaneous polarization and the orientation of the electric field in the second waveguide 34 of the delayed interferometer 300 are set to the same will be described below as a third embodiment.

[c] Third Embodiment

Figure 6:
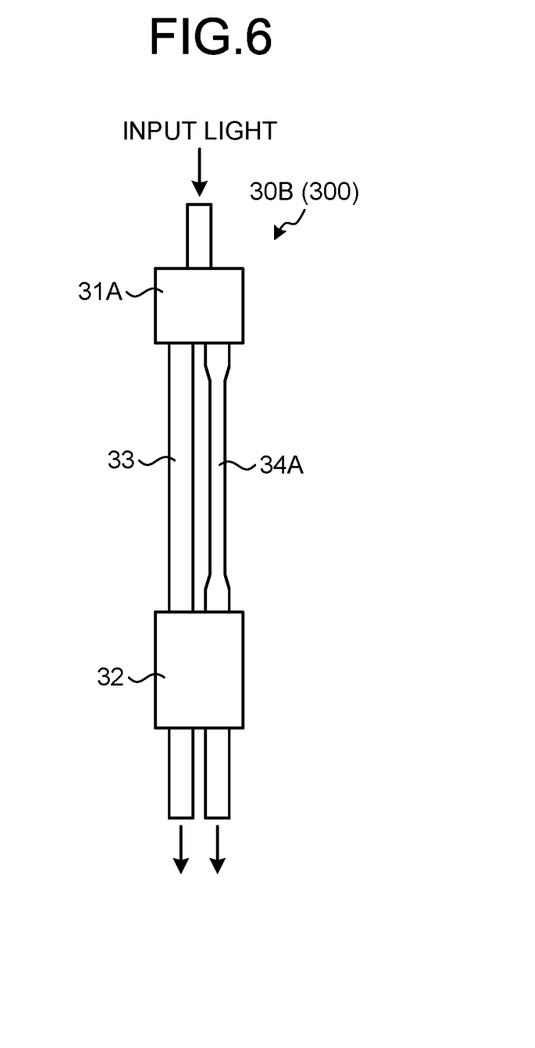
FIG. 6 is a schematic plan view illustrating an example of a configuration of a tap coupler according to a third embodiment.

FIG. 6 is a schematic plan view illustrating an example of a configuration of a tap coupler 30B according to the third embodiment. The tap coupler 30B illustrated in FIG. 6 is different from the tap coupler 30A illustrated in FIG. 5 in that a second waveguide 34A has a linear shape such that an orientation of an electric field of the second waveguide 34A is the same as the orientation of the electric field of the first waveguide 33, that is, the same as the Z-axis direction of the crystal axis. A width of the second waveguide 34A is reduced as compared to a width of the first waveguide 33, so that an optical length difference occurs.

The orientation of the electric field of the second waveguide 34A is the Z-axis direction that is the same as the orientation of the electric field of the first waveguide 33 and the orientation of the internal electric field of the spontaneous polarization, so that it is possible to stabilize the refractive indices of the first waveguide 33 and the second waveguide 34A. As a result, even if the orientations of the electric fields of the first waveguide 33 and the second waveguide 34A are set to the same Z-axis direction, it is possible to stabilize the split ratio of the tap coupler 30.

The tap coupler 30B according to the third embodiment has a linear shape such that the orientations of the electric fields of the first waveguide 33 and the second waveguide 34A are set to the same Z-axis direction of the crystal axis, and the width of the second waveguide 34A is reduced as compared to the width of the first waveguide 33. As a result, even if the orientations of the electric fields of the first waveguide 33 and the second waveguide 34A are set to the same Z-axis direction, it is possible to stabilize the electric fields in the waveguides and stabilize the split ratio.

Meanwhile, in the first embodiment, the light propagation direction of the first waveguide 33 in the tap coupler 30 is the same as the light propagation directions of the thin-film optical waveguides 60 in the first DC modulation units 21F, so that the tap coupler 30 becomes unstable at the time of temperature change. The LN crystal of the thin-film LN substrate 53 has anisotropy, and an electro-optic effect in the Z-axis direction is larger than those in the X-axis direction and the Y-axis direction. Therefore, in the first DC modulation units 21F, an electric field is applied in the Z-axis direction to improve modulation efficiency, and the light propagation directions of the thin-film optical waveguides 60 are set to the Y direction.

In contrast, when temperature of the LN crystal is changed, the spontaneous polarization in the Z-axis direction is changed, so that the electric fields in the first waveguide 33 and the second waveguide 34 of the tap coupler 30 are changed, and the refractive indices of the first waveguide 33 and the second waveguide 34 are changed. As a result, the optical length difference between the two waveguides, that is, the first waveguide 33 and the second waveguide 34, included in the tap coupler 30 is changed, and the split ratio of the tap coupler 30 is changed. For example, if the length of the waveguide is denoted by L and the refractive index of the waveguide is denoted by N, the optical length is calculated by N×L. Therefore, the lengths N of the first waveguide 33 and the second waveguide 34 in the tap coupler 30 are different, so that the optical lengths of the first waveguide 33 and the second waveguide 34 are different. Consequently, if temperature change occurs, an optical length difference occurs between the first waveguide 33 and the second waveguide 34, so that the split ratio of the tap coupler 30 is changed.

Figure 7:
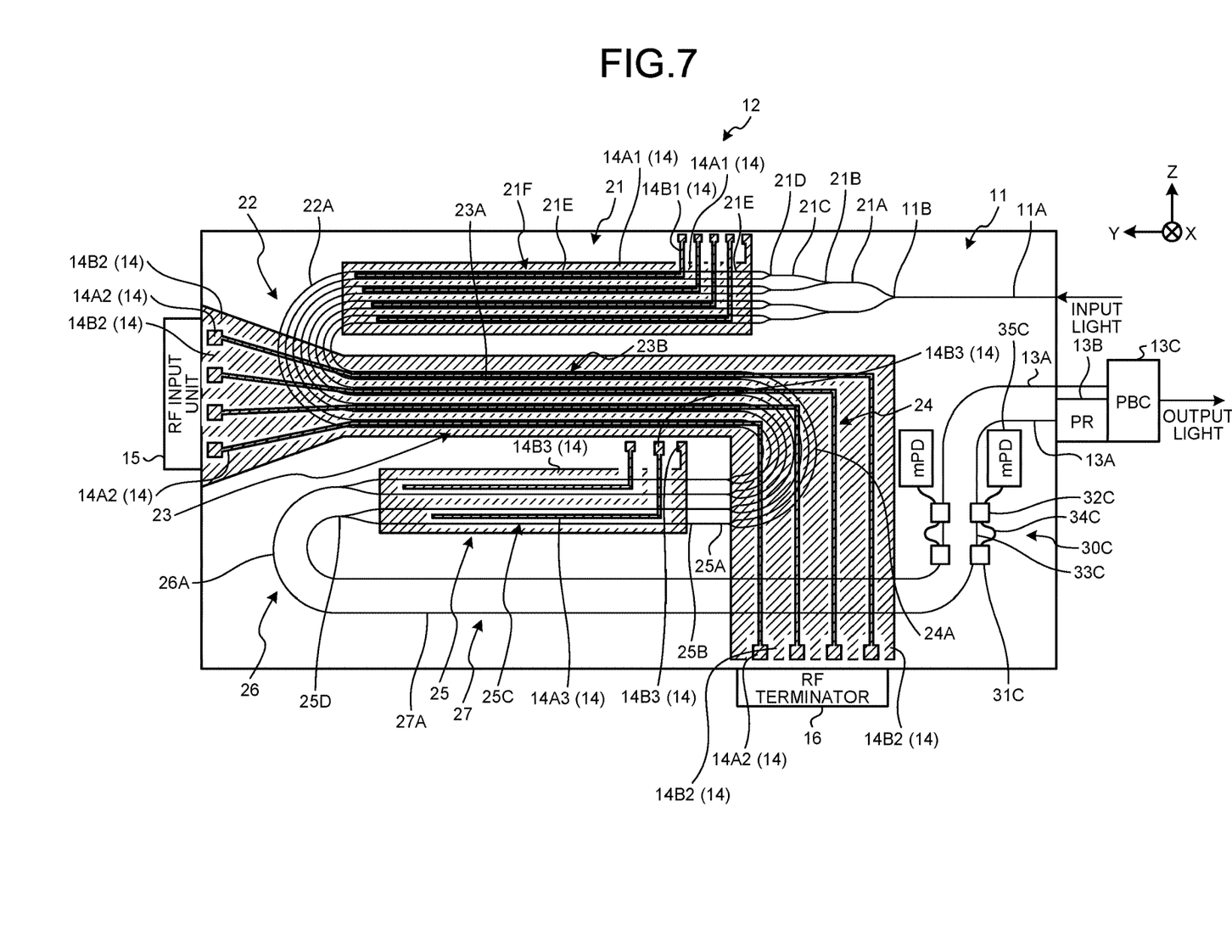
FIG. 7 is a schematic plan view illustrating an example of a configuration of an optical modulator according to a fourth embodiment.

To cope with the situation as described above, it may be possible to arrange a tap coupler 30C such that the light propagation directions (Y direction) of the thin-film optical waveguides 60 in the first DC modulation units 21F are approximately perpendicular to the light propagation directions (Z direction) of the first waveguide 33 and the second waveguide 34 in the tap coupler 30. This embodiment will be described below as a fourth embodiment.

[d] Fourth Embodiment

FIG. 7 is a schematic plan view illustrating an example of a configuration of the optical modulator 5 according to the fourth embodiment. The optical modulator 5 illustrated in FIG. 7 is different from the optical modulator 5 illustrated in FIG. 2 in that the tap couplers 30C are arranged such that light propagation directions of the tap couplers 30C are oriented in, for example, the Z-axis direction of the thin-film LN crystal, that is, a direction that is approximately perpendicular to the light propagation directions (Y direction) of the first DC modulation units 21F. Each of the tap couplers 30C includes a first coupler 31C, a second coupler 32C, a first waveguide 33C, a second waveguide 34C, and a monitor 35C.

The first coupler 31C is optically coupled with the LN waveguide 27A and is arranged such that a light propagation direction is oriented in the Z-axis direction of the crystal axis. The second coupler 32C is optically coupled with the LN waveguide 13A and is arranged such that a light propagation direction is oriented in the Z-axis direction of the crystal axis. Further, the first waveguide 33C optically couples the first coupler 31C and the second coupler 32C, and is arranged such that a light propagation direction is oriented in the Z-axis direction of the crystal axis. The second waveguide 34C optically couples the first coupler 31C and the second coupler 32C and is arranged such that a light propagation direction is oriented in the Z-axis direction of the crystal axis.

If the orientations of the thin-film optical waveguides 60 of the first DC modulation units 21F, that is, the light propagation directions, are set to the Y direction, electric field directions in the thin-film optical waveguides 60 of the first DC modulation units 21F are set to the Z direction. In contrast, if the orientations of the first waveguides 33C of the tap couplers 30C, that is, the light propagation directions of the first waveguides 33C, are set to the Z direction, electric field directions in the first waveguides 33C of the tap couplers 30C are set to the Y direction. Further, the orientation of the internal electric field of the spontaneous polarization of the thin-film LN crystal is the Z direction, which is different from the electric field directions (Y direction) of the tap couplers 30C. As a result, even if temperature change occurs, a change in the refractive indices of the first waveguides 33C and the second waveguides 34C due to the internal electric field of the spontaneous polarization is reduced, so that it is possible to stabilize the split ratios of the tap couplers 30C in which the delayed interferometers 300 is used.

A TE mode and a TM mode are known as modes of light that propagates through the thin-film optical waveguides 60, and the TE mode is adopted as the mode of light that is modulated by the first DC modulators 21F. An orientation of the electric field of the TE mode that propagates in the Y direction is the Z direction, and in the Z direction, a change in the refractive index due to temperature change is large. In contrast, an orientation of the electric field of the TE mode that propagates in the Z direction is the Y direction, and in the Y direction, a change in the refractive index due to temperature change is small. Therefore, when the light propagation directions of the tap couplers 30 are set to the Z direction, a change in the refractive indices at the time of temperature change is reduced, so that it is possible to stabilize the split ratios of the tap couplers 30.

Meanwhile, the case has been illustrated in which the tap couplers 30 of the first embodiment are arranged such that the light propagation directions of the first couplers 31, the second couplers 32, the first waveguides 33, and the second waveguides 34 are set to the same. However, the first waveguides 33 in the tap couplers 30 may be arranged such that the light propagation directions of the first waveguides 33 are approximately perpendicular to the light propagation directions of the first couplers 31 and the second couplers 32, and this embodiment will be described below as a fifth embodiment.

[e] Fifth Embodiment

Figure 8:
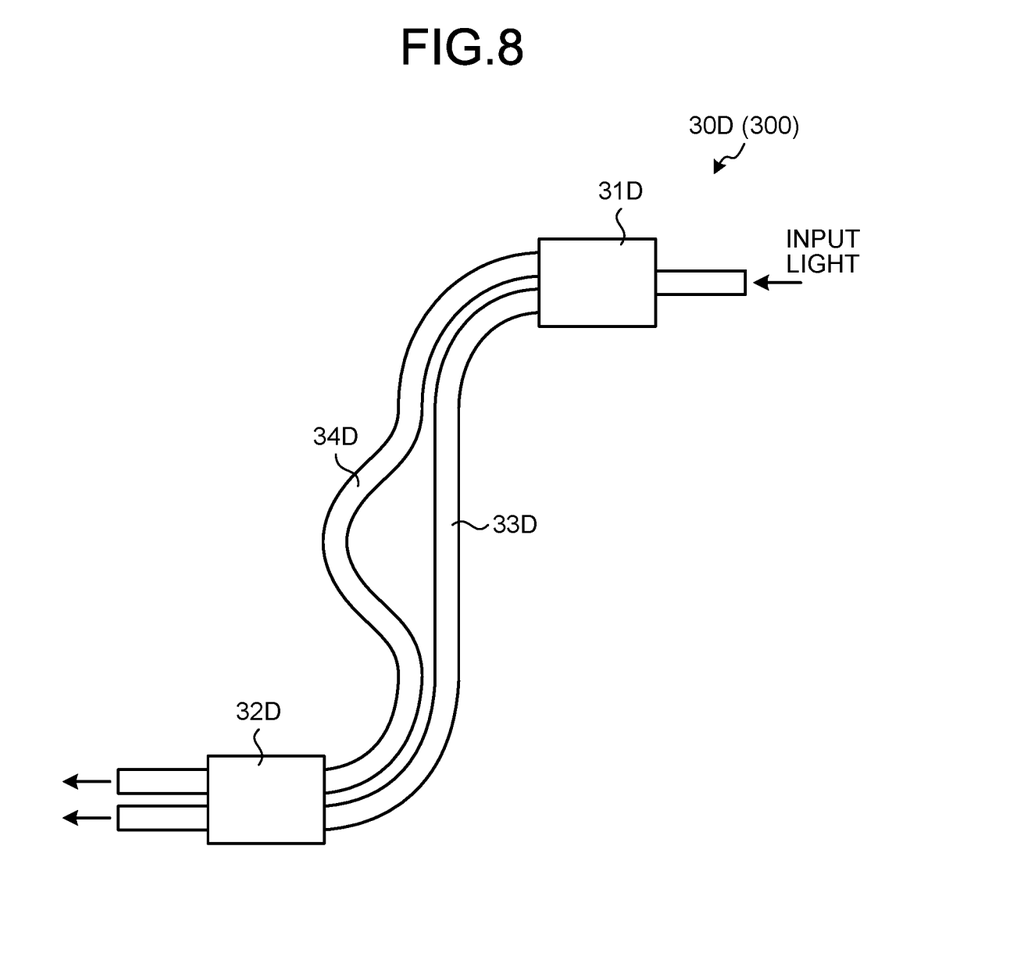
FIG. 8 is a schematic plan view illustrating an example of a configuration of a tap coupler according to a fifth embodiment.

FIG. 8 is a schematic plan view illustrating an example of a configuration of a tap coupler 30D according to the fifth embodiment. A feature of the tap coupler 30D illustrated in FIG. 8 is that a first waveguide 33D and a second waveguide 34D are arranged such that light propagation directions of the first waveguide 33D and the second waveguide 34D are approximately perpendicular to light propagation directions of a first coupler 31D and a second coupler 32D. The tap coupler 30D includes the first coupler 31D, the second coupler 32D, the first waveguide 33D, the second waveguide 34D, and a monitor 35D.

The first coupler 31D is optically coupled with the LN waveguide 27A and is arranged such that a light propagation direction is oriented to the Y-axis direction of the crystal axis. The second coupler 32D is optically coupled with the LN waveguide 13A and is arranged such that a light propagation direction is oriented to the Y-axis direction of the crystal axis. Further, the first waveguide 33D optically couples the first coupler 31D and the second coupler 32D and is arranged such that a light propagation direction is oriented to the Z-axis direction of the crystal axis. The second waveguide 34D optically couples the first coupler 31D and the second coupler 32D and is arranged such that a light propagation direction is oriented to the Z-axis direction of the crystal axis.

In the tap coupler 30D according to the fifth embodiment, the first coupler 31D, the second coupler 32D, the first waveguide 33D, and the second waveguide 34D are arranged such that the light propagation directions of the first coupler 31D and the second coupler 32D are set to the Y-axis direction and the light propagation directions of the first waveguide 33D and the second waveguide 34D are set to the Z-axis direction. As a result, it is possible to reduce a size of the tap coupler 30D in the Y-axis direction when the light propagation directions of the first coupler 31D and the second coupler 32D are set to the Y-axis direction.

Meanwhile, the case has been illustrated in which, in the tap coupler 30D according to the fifth embodiment, the light propagation directions of the first coupler 31D and the second coupler 32D are set to the Y-axis direction, and the light propagation directions of the first waveguide 33D and the second waveguide 34D are set to the Z-axis direction. However, appropriate change is applicable, and it may be possible to arrange the first coupler 31D, the second coupler 32D, the first waveguide 33D, and the second waveguide 34D such that the light propagation directions of the first coupler 31D and the second coupler 32D are set to the Z-axis direction and the light propagation directions of the first waveguide 33D and the second waveguide 34D are set to the Y-axis direction.

Furthermore, the rib waveguide is illustrated as an example of the LN waveguides but embodiments are not limited to the rib waveguide. The technology is applicable to a channel waveguide, a deep ridge waveguide, or the like, for example.

According to one embodiment of an optical device or the like disclosed in the present application, it is possible to ensure a stable split ratio.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical device comprising:
   a modulator that includes an optical waveguide that is formed of a thin-film lithium niobate (LN) substrate and through which light passes; and an electrode that applies voltage to the optical waveguide, and modulates a phase of the light that passes through the optical waveguide in accordance with an electric field in the optical waveguide, the electric field corresponding to the voltage;

a tap coupler that includes at least a part formed of the thin-film LN substrate, and splits a part of the light that passes through an inside of the optical waveguide; and a monitor that is coupled to the tap coupler and monitors the part of the light split by the tap coupler;

wherein the tap coupler includes a delayed interferometer that splits a part of the light that passes through the optical waveguide, at a split ratio corresponding to a phase difference of light that passes through an inside of the tap coupler from the optical waveguide; and wherein the delayed interferometer includes a first coupler that receives the light input from the optical waveguide and splits the input light;

a first waveguide that is formed of the thin-film LN substrate and through which one part of light split from the first coupler passes;

a second waveguide that is formed of the thin-film LN substrate, through which other part of light split from the first coupler passes, and that delays optical output as compared to the first waveguide; and a second coupler that multiplexes the one part of light from the first waveguide and the other part of light from the second waveguide, and splits the multiplexed light with a phase difference at a split ratio corresponding to the phase difference.

2. The optical device according to claim 1, wherein the first waveguide has an optical length that is different from an optical length of the second waveguide.

3. The optical device according to claim 2, wherein the first waveguide has a waveguide length that is different from a waveguide length of the second waveguide.

4. The optical device according to claim 1, wherein the second waveguide is a curved waveguide that includes a portion in which a propagation direction is different from a propagation direction of the light in the first waveguide.

5. The optical device according to claim 1, wherein the first waveguide and the second waveguide are formed of the thin-film LN substrate in a state in which a propagation direction of light in the second waveguide is same as a propagation direction of the light in the first waveguide and a width of the second waveguide is different from a width of the first waveguide.

6. The optical device according to claim 1, wherein the tap coupler is arranged such that a propagation direction of the light in the first waveguide is oriented in a direction that is approximately perpendicular to a propagation direction of the light in the optical waveguide.

7. The optical device according to claim 6, wherein when the propagation direction of the light in the optical waveguide is a Z-axis direction of an LN crystal of the thin-film LN substrate, the propagation direction of the light in the first waveguide corresponds to a Y-axis direction of the LN crystal.

8. The optical device according to claim 1, wherein the first coupler, the second coupler, the first waveguide, and the second waveguide are arranged such that propagation directions of the light in the first coupler and the second coupler are approximately perpendicular to propagation directions of the light in the first waveguide and the second waveguide.

9. The optical device according to claim 1, wherein each of the first coupler and the second coupler is a multi-mode interference (MMI) coupler.

10. An optical communication apparatus comprising:

a processor that performs signal processing on an electric signal;

a light source that generates light;

a modulator that includes an optical waveguide that is formed of a thin-film lithium niobate (LN) substrate and through which light passes; and an electrode that applies voltage to the optical waveguide, and modulates a phase of the light that passes through the optical waveguide in accordance with an electric field in the optical waveguide, the electric field corresponding to the voltage;

a tap coupler that includes at least a part formed of the thin-film LN substrate, and splits a part of the light that passes through an inside of the optical waveguide; and a monitor that is coupled to the tap coupler and monitors the part of the light split by the tap coupler;

wherein the tap coupler includes a delayed interferometer that splits a part of the light that passes through the optical waveguide, at a split ratio corresponding to a phase difference of light that passes through an inside of the tap coupler from the optical waveguide; and wherein the delayed interferometer includes a first coupler that receives the light input from the optical waveguide and splits the input light;

a first waveguide that is formed of the thin-film LN substrate and through which one part of light split from the first coupler passes;

a second waveguide that is formed of the thin-film LN substrate, through which other part of light split from the first coupler passes, and that delays optical output as compared to the first waveguide; and a second coupler that multiplexes the one part of light from the first waveguide and the other part of light from the second waveguide, and splits the multiplexed light with a phase difference at a split ratio corresponding to the phase difference.

\* \* \* \* \*